United States Patent
Diab et al.

(10) Patent No.: US 7,664,972 B2
(45) Date of Patent: Feb. 16, 2010

(54) SYSTEM AND METHOD FOR CONTROLLING POWER DELIVERED TO A POWERED DEVICE BASED ON CABLE CHARACTERISTICS

(75) Inventors: Wael William Diab, San Francisco, CA (US); Minshine Shih, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 64 days.

(21) Appl. No.: 11/654,023

(22) Filed: Jan. 17, 2007

(65) Prior Publication Data

US 2008/0148081 A1    Jun. 19, 2008

Related U.S. Application Data

(60) Provisional application No. 60/853,330, filed on Dec. 19, 2006.

(51) Int. Cl.
  *G06F 1/00* (2006.01)
  *G06F 11/30* (2006.01)
  *G06F 15/16* (2006.01)
(52) U.S. Cl. .................. 713/300; 713/340; 709/200
(58) Field of Classification Search ............... 713/300, 713/340; 709/200
  See application file for complete search history.

(56) References Cited

U.S. PATENT DOCUMENTS

| 6,980,007 | B1 | 12/2005 | Lo et al. |
| 7,075,283 | B1 | 7/2006 | Lo et al. |
| 7,203,851 | B1* | 4/2007 | Lo et al. ............ 713/310 |
| 7,340,363 | B2* | 3/2008 | Tsai .................... 702/117 |
| 7,353,407 | B2 | 4/2008 | Diab et al. |
| 7,355,416 | B1* | 4/2008 | Darshan ............. 324/713 |
| 7,375,532 | B1 | 5/2008 | Lo et al. |
| 7,403,018 | B1 | 7/2008 | Lo et al. |
| 2004/0251913 | A1 | 12/2004 | Pharn et al. |
| 2005/0262364 | A1* | 11/2005 | Diab et al. ........... 713/300 |
| 2006/0146842 | A1* | 7/2006 | David et al. ......... 370/401 |
| 2007/0103829 | A1* | 5/2007 | Darshan et al. ...... 361/90 |
| 2008/0129118 | A1* | 6/2008 | Diab .................... 307/35 |

FOREIGN PATENT DOCUMENTS

| WO | WO 2005117337 A1 | 12/2005 |
| WO | WO 2006052360 A1 | 5/2006 |

* cited by examiner

*Primary Examiner*—Ji H Bae
(74) *Attorney, Agent, or Firm*—Duane S. Kobayashi (57) ABSTRACT

A system and method for discovering a cable type and resistance for Power over Ethernet (PoE) applications. Cabling power loss in PoE applications is related to the resistance of the cable itself. A PHY can be designed to measure electrical characteristics (e.g., insertion loss, cross talk, length, etc.) of the Ethernet cable to enable determination of the cable resistance. The determined resistance can be used in powering decisions and in adjusting power budgets allocated to power source equipment ports.

12 Claims, 8 Drawing Sheets

SYSTEM AND METHOD FOR CONTROLLING POWER DELIVERED TO A POWERED DEVICE BASED ON CABLE CHARACTERISTICS

This application claims priority to provisional application No. 60/853,330, filed Dec. 19, 2006, which is incorporated by reference herein, in its entirety, for all purposes.

BACKGROUND

1. Field of the Invention

The present invention relates generally to network cabling systems and methods and, more particularly, to the discovery of cabling type for power over Ethernet (PoE) applications.

2. Introduction

The IEEE 802.3af PoE standard provides a framework for delivery of power from power source equipment (PSE) to a powered device (PD) over Ethernet cabling. In this PoE process, a valid device detection is first performed. This detection process identifies whether or not it is connected to a valid device to ensure that power is not applied to non-PoE capable devices.

After a valid PD is discovered, the PSE can optionally perform a power classification. IEEE 802.3af defines five power classes for a PD device. The completion of this power classification process enables the PSE to manage the power that is delivered to the various PDs connected to the PSE. If a particular power class is identified for a particular PD, then the PSE can allocate the appropriate power for that PD. If power classification is not performed, then a default classification can be used where the PSE supplies the full 15.4 W of power onto the particular port.

Management of the power budgets that are allocated to the various PDs connected to the PSE is crucial for efficient operation of the PSE. Management of power budgets are even more critical in a PoE Broad Reach application where the PD is connected to the PSE using an Ethernet cable greater than 100 meters (e.g., 300-500 meters). In general, the total amount of power that can be allocated to the various PDs is limited by the capacity of the PSE. Thus, what is needed is a mechanism that enables the PSE to identify an accurate amount of power that should be budgeted on each port.

SUMMARY

A system and/or method for controlling power delivered to powered devices, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
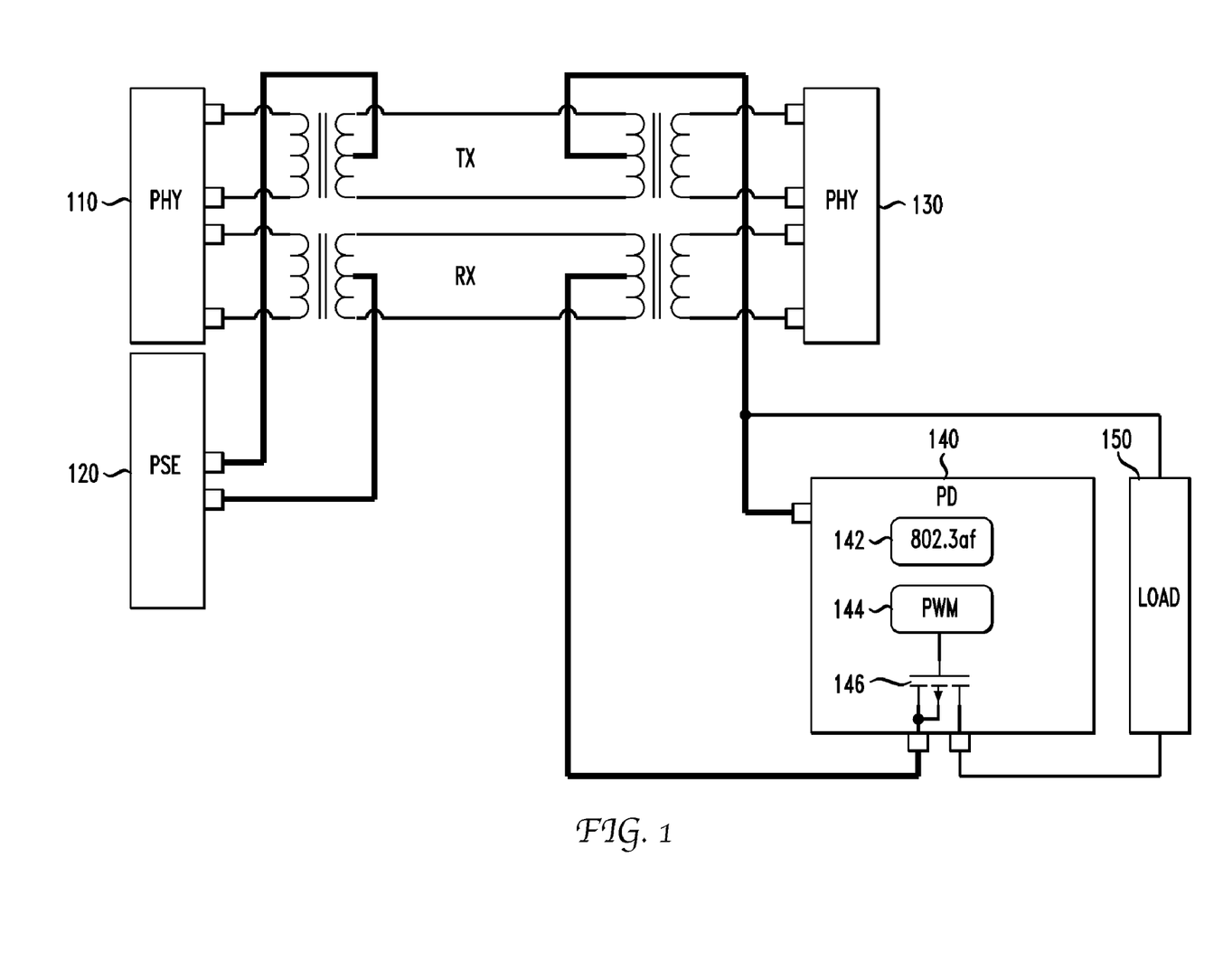
FIG. 1 illustrates an embodiment of a Power over Ethernet (PoE) system.

FIG. 1 illustrates an embodiment of a power over Ethernet (PoE) system. As illustrated, the PoE system includes power source equipment (PSE) 120 that transmits power to powered device (PD) 140. Power delivered by the PSE to the PD is provided through the application of a voltage across the center taps of transformers that are coupled to a transmit (TX) pair and a receive (RX) pair of wires carried within an Ethernet cable. The two TX and RX pairs enable data communication between Ethernet PHYs 110 and 130.

As is further illustrated in FIG. 1, PD 140 includes 802.3af module 142. This module includes the electronics that would enable PD 140 to communicate with PSE 120 in accordance with the IEEE 802.3af standard. PD 140 also includes pulse width modulation (PWM) DC:DC controller 144 that controls power FET 146, which in turn provides constant power to load 150. In general, there are two types of loads: a purely resistive load (e.g., lamp) and a constant power load that is fed by a DC:DC power controller. The present application is primarily directed to constant power loads fed by a DC:DC power controller.

Figure 2A:
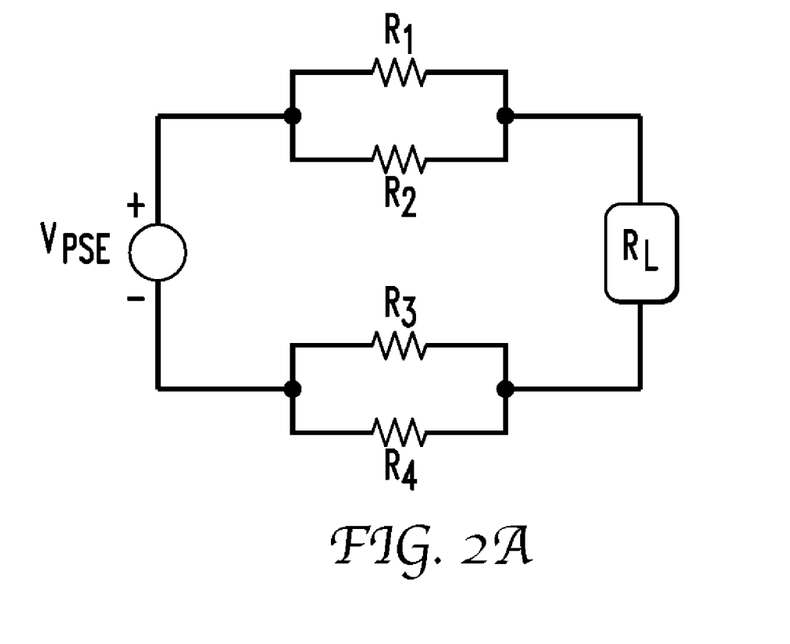
FIGS. 2A and 2B illustrate circuit diagrams that model the PoE system.

The delivery of power from PSE 120 to load 150 can be modeled by the circuit model illustrated in FIG. 2A. As illustrated, a power source provides a voltage $V_{PSE}$ to a circuit that includes a first parallel pair of resistors ($R_1$, $R_2$), a load resistance $R_{LOAD}$, and a second parallel pair of resistors ($R_3$, $R_4$). Here, the first parallel pair of resistors $R_1$, $R_2$ represents the resistances of the TX pair of wires, while the second parallel pair of resistors $R_3$, $R_4$ represents the resistances of the RX pair of wires.

The values of resistors $R_1$, $R_2$, $R_3$, and $R_4$ depend on the type and length of Ethernet cable. Specifically, the resistors $R_1$, $R_2$, $R_3$, and $R_4$ have a certain resistance/length that is dependent on a type of Ethernet cable (e.g., Category 3, 5, 6, etc.). For example, for Category 3 Ethernet cable, resistors $R_1$, $R_2$, $R_3$, and $R_4$ would have a resistance of approximately 0.2Ω/meter. Thus, for a 100-meter Category 3 Ethernet cable, each of resistors $R_1$, $R_2$, $R_3$, and $R_4$ would have a value of 20Ω. In this example, parallel resistors $R_1$ and $R_2$ would have an equivalent resistance of 10Ω, while parallel resistors $R_3$ and $R_4$ would also have an equivalent resistance of 10Ω. In combination, the total value of the Ethernet cable resistance ($R_{cable}$) can then be determined as the sum of 10Ω+

Figure 2B:
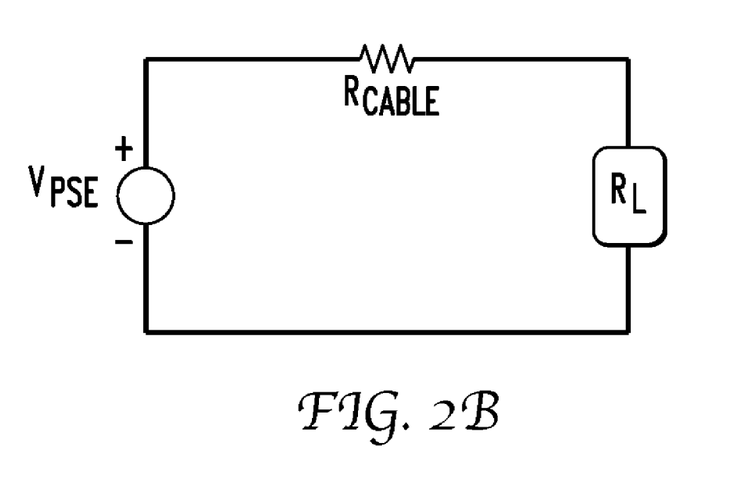

10Ω=20Ω. A simplified PoE circuit model that includes the single cable resistance value $R_{cable}$ is illustrated in FIG. 2B.

In the IEEE 802.3af standard, a PSE can optionally perform a classification step that identifies a power classification of the PD. Table 1 below shows the five PD classes supported by the IEEE 802.3af standard.

TABLE 1

| Class | Usage | Min Power Output by PSE | Max Power Input at PD |
|---|---|---|---|
| 0 | Default | 15.4 W | 0.44 to 12.95 W |
| 1 | Optional | 4.0 W | 0.44 to 3.84 W |
| 2 | Optional | 7.0 W | 3.84 to 6.49 W |
| 3 | Optional | 15.4 W | 6.49 to 12.95 W |
| 4 | Reserved | Act as Class 0 | Reserved |

As illustrated, the Class 0 (default) and Class 3 PD classifications specify the PSE's minimum output power as 15.4 W. For lower power PDs such as Class 1 and Class 2 devices, the PSE's minimum output power is specified as 4.0 W and 7.0 W, respectively. While optional, the identification of the correct PD power classification enables the PSE to budget only as much power as is needed on each port. This effectively increases the capacity of the PSE in supplying power to a set of connected PDs.

It is a feature of the present invention that the measurement of one or more characteristics of the Ethernet cable can be used to impact the operation of the PoE system. In one embodiment, the measured characteristics are used to identify a type and/or length of Ethernet cable. The identified type and/or length of Ethernet cable can then be used to estimate a resistance of the Ethernet cable. In turn, the estimated resistance of the Ethernet cable can be used to assess power losses in the cable, which impacts the power budget that is allocated for a particular PSE port.

Figure 3:
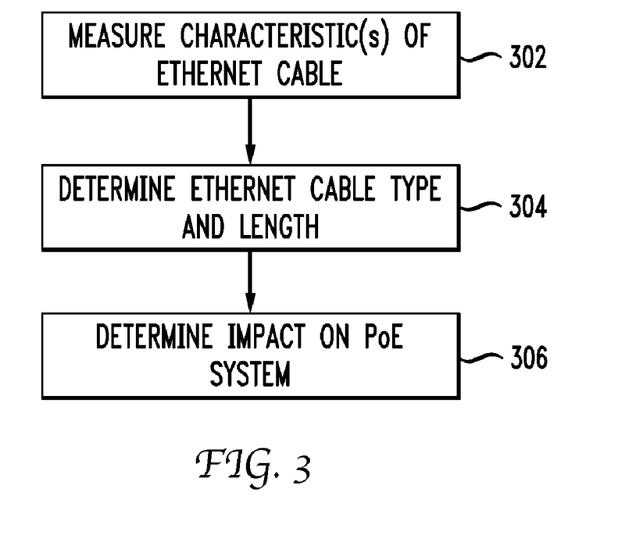
FIG. 3 illustrates a flowchart of a PoE process.

To illustrate this general process of the present invention, reference is made to the flowchart of FIG. 3. As illustrated, the process begins at step 302, where one or more characteristics of an Ethernet cable are measured. In one embodiment, this measurement step can be implemented as part of the PHY's analysis of the electrical characteristics of the Ethernet cable. For example, the measurement step can be implemented as part of an echo cancellation convergence process implemented by the PHY.

In one embodiment, the one or more characteristics of the Ethernet cable that are measured at step 302 are those characteristics that would enable the PoE system to better estimate the resistance of the Ethernet cable. Here, the estimate of the actual cable resistance would enable the PoE system to estimate the actual power loss of the cable. In one embodiment, the PHY is designed to measure characteristics that would enable a determination of the insertion loss, cross talk, and length of the Ethernet cable.

At step 304, after the one or more characteristics of the Ethernet cable are measured, the PoE system would then determine an Ethernet cable type and length. In one embodiment, the Ethernet cable type is determined based on the measured insertion loss, cross talk, and length of the Ethernet cable. These measurements of the Ethernet cable would enable the PoE system to determine, for example, whether the Ethernet cable is a Category 3, 5, 6, or 7 Ethernet cable.

As would be appreciated, the different cable types have different resistances associated therewith. For example, Category 3 Ethernet cable has a resistance of approximately 0.2Ω/meter, while Category 5 Ethernet cable has a resistance of approximately 0.1Ω/meter. Once the type and length of the Ethernet cable is identified at step 304, the PoE system can then determine its impact on the PoE system at step 306.

As will be described in greater detail below, the particular impact of the cable type and length information on the PoE system can vary depending on the application. Here, it is a feature of the present invention that the cable type and length information can be used by the PoE system in a dynamic configuration or operation process. For example, the identified type and length of the Ethernet cable can be used to diagnose the Ethernet cable, determine whether power can be supplied to a PD, determine an adjustment to a power budget for a given PSE port, etc.

To illustrate different ways that the identified type and length of the Ethernet cable can impact a PoE system, consider a first application related to a conventional PoE system such as that supported by the IEEE 802.3af specification. In this application, the determination of the type and length of cable can be used to identify the resistance $R_{cable}$ (See FIG. 2B).

In the circuit model of FIG. 2B, where the PD includes a DC:DC converter, the load $R_L$ would receive constant power, $P_L$, and see a voltage $V_L$ on its input. Since $P_L$ is fixed at the load, $P_L=I*V_L$, where I is the current going through the whole circuit. The power loss of the cable would then be $P_{loss}=I^2*R_{cable}$.

In specifying the minimum output power of 15.4 W for the PSE, the IEEE 802.3af standard assumes that the PD is connected to the PSE using 100 m of Category 3 cable. The resistance of the 100 m of Category 3 cable is approximately 20Ω. At a current limit of 350 mA, the worst-case power loss attributed to the cable is $P_{loss}=(350\text{ mA})^2*20\Omega=2.45$ W. This worst-case power loss of 2.45 W is the difference between the PSE's minimum output power and the max power drawn by the PD (i.e., 15.4 W−12.95 W=2.45 W).

In accordance with the present invention, the worst-case power budget allocated to a PSE port can be adjusted based on a determination of a type of Ethernet cable. Specifically, without any additional knowledge of the PoE system, the identification of a type of Ethernet cable would yield a more accurate assessment of the power loss. For example, assume that the measured characteristics indicate that the PD is coupled to the PSE using Category 5 instead of Category 3 cable. Even with worst-case assumptions of the cable length of 100 m and a current of 350 mA, the resistance of the cable would be estimated as 10Ω for Category 5 cable instead of 20Ω for Category 3 cable. The determined reduction in the resistance by one half, would therefore reduce the power loss by one half to 1.225 W. The corresponding 1.225 W power savings would serve to reduce the power budget attributed to that port, thereby effectively increasing the capacity of the PSE.

A more accurate power loss assessment can also be gained through the determination of the cable length along with the determination of the cable type. With the additional cable length information, the resistance of the cable can be further reduced from the worst case of 100 m. For example, assume that the type of cable is determined to be Category 5, and that it is further determined that the length of the cable is 50 m. In this example, the resistance of the Category 5 cable would be reduced further by one half to 5Ω. The power loss attributed to the 50 m of Category 5 cable would then be $P_{loss}=(350\text{ mA})^2*5\Omega=0.6125$ W. The corresponding power savings of 2.45 W−0.6125 W=1.8375 W would then serve to reduce the power budget allocated to that port. It should be noted that the determination of the cable length alone can produce power savings benefits such as those outlined above. While conventional systems may have contemplated the use of cable length determinations in typical PoE applications (i.e., under 100 m), the use of cable length determinations in PoE applications greater than 100 m is a unique feature of the present invention.

In the above examples, a determination of the cable type alone or in combination with the length of the Ethernet cable served to reduce the power budget allocated to a PSE port. The identification of the cable type therefore provides significant benefits beyond an identification of only the cable length. Significantly, these benefits were achieved without any additional knowledge of the system. More detailed power loss calculations can also be generated if additional information is available to the system.

Across the cable, the voltage drop can be defined as $V_{PSE}-V_L=I*R_{cable}$. This equation can be solved for the voltage $V_L$ allowed at the PD as follows:

$$V_{PSE}-V_L=I*R_{cable}$$

$$V_{PSE}-V_L=(P_L/V_L)*R_{cable}$$

$$V_{PSE}*V_L-V_L^2=P_L*R_{cable}$$

$$V_L^2-V_{PSE}*V_L+P_L*R_{cable}=0$$

$$V_L=[V_{PSE}+/-SQRT(V_{PSE}^2-(4*P_L*R_{cable}))]/2$$

If $V_{PSE}$ is known to be 48V, $P_L$ is 12.95 W (max power allowed for PD), and $R_{cable}$ is determined to be 5Ω (resistance of 50 m of Category 5 cable), then $V_L=(48+/-SQRT(48^2-4*12.95*5))/2=(48+/-45.22)/2=46.61V$. The current can then be calculated using $V_{PSE}-V_L=I*R_{cable}$, such that 48V−46.61V=I*5Ω results in I=0.278A. The total power output by the PSE is then 12.95 W plus the power loss in the cable. The power loss in the cable in this case is $I^2*R_{cable}=(0.278A)^2*5Ω=0.39$ W. The total power budget attributed to the PSE port in this example would be 12.95 W+0.39 W=13.34 W. The power budget savings would then be 15.4 W−13.34 W=2.06 W.

As this example further illustrates, the IEEE 802.3af standard's worst-case cable assumption of 100 m of Category 3 cable, which leads to a worst-case cable resistance of 20Ω, results in an unnecessary waste in the power budget attributed to a port. When aggregated across all of the PSE's ports, the waste in the power budget serves to unnecessarily reduce the real powering capacity of the PSE.

A second application in which the principles of the present invention can be applied is a PoE+ application such as that supported by the future IEEE 802.3at specification. The PoE+ application is designed to support higher-power PDs and assumes that Category 5 or better Ethernet cable is used. PDs of up to 30 W are being considered for two-pair PoE+ systems, while PDs of up to 56 W are being considered for four-pair PoE+ systems. As would be appreciated, the same principles would apply for both two-pair and four-pair systems. In general, the support for higher-power PDs with PoE+ would make equipment like WiMAX transmitters, pan-tilt-zoom cameras, videophones and thin clients possible.

In this application, the principles of the present invention can be used first as a diagnostic tool to validate the Ethernet cable that is connected to a PSE port. In one embodiment, the diagnostic tool would identify the Ethernet cable type and use that identification to determine how to handle a PoE+ PD device.

In one embodiment, if the Ethernet cable is determined to be Category 3 cable, then the PSE can refuse to power the PoE+ PD device on that port. In another embodiment, the diagnostic tool can be used to extend the potential application of the PoE+ PSE. For example, even if the diagnostic tool has determined that the PoE+ PD device is connected to the PSE using a Category 3 cable, the diagnostic tool could proceed to determine whether the PoE+ PD device can still be powered through the Category 3 cable. For example, the diagnostic tool can be used to validate the port to determine whether it could accommodate a PoE+ PD device even though it is connected to the PSE via a Category 3 cable. This validation can be based on the actual characteristics (e.g., length) of the cable, rather than simply on the cable type (e.g., Category 3, 5, etc.).

Even though the Category 3 cable has approximately double the resistance of the Category 5 cable, the Category 3 cable could nonetheless be used in the PoE+ application in certain situations. Information such as the length of the Category 3 cable, $V_{PSE}$, $V_L$, and power of the PoE+ PD can be used by the PSE to make intelligent decisions about whether to apply power to a particular port and how much of a power budget to allocate to that port. In effect, this intelligent decision making enables the PSE to identify additional port installations that can benefit from PoE+ without relying on an overly broad characterization of the limitations of the installed Ethernet cable.

For example, consider a scenario where $V_{PSE}$ is 50V, $P_L$ is 15 W, and $R_{cable}$ is determined to be 15Ω (resistance of 75 m of Category 3 cable). For this set of operating parameters, $V_L$ can be calculated as $V_L=(50+/-SQRT(50^2-4*15*15))/2=(50+/-40)/2=45V$. The current can then be calculated using $V_{PSE}-V_L=I*R_{cable}$, such that 50V−45V=I*15Ω results in I=0.333A. The power loss in the cable can be calculated as $I^2*R_{cable}=(0.333A)^2*15Ω=1.66$ W. The total power budget attributed to the PSE port in this example would then be 15 W+1.66 W=16.66 W. As this set of operating conditions is within permissible operating conditions of the Category 3 cable, the PSE can choose to power the PoE+ PD over the Category 3 cable.

In another scenario, if $V_{PSE}$ is 50V, $P_L$ is 20 W, and $R_{cable}$ is determined to be 20Ω (resistance of 100 m of Category 3 cable), then $V_L$ can be calculated as $V_L=(50+/-SQRT(50^2-4*20*20))/2=(50+/-30)/2=40V$. The current can then be calculated using $V_{PSE}-V_L=I*R_{cable}$, such that 50V−40V=I*20Ω results in I=0.5A. Regardless of whether the power loss ($I^2*R_{cable}=(0.5A)^2*20Ω=5$ W) is acceptable, the current I of 500 mA is above the current threshold of 350 mA for Category 3 cable. In this case, the PSE can choose not to power the PoE+ PD over the Category 3 cable.

In yet another example, assume that $P_L$ is 15 W, $R_{cable}$ is determined to be 20Ω (resistance of 100 m of Category 3 cable), and $V_L$ is known to be 43V. As would be appreciated, $V_L$ can be communicated from the PD to the PSE using various communication means, such as some form of layer 2 communication. In this case, the current I can be calculated using $I=P_L/V_L=15$ W/43V=0.349A. In this case, the PSE could choose to power the PoE+ PD over the Category 3 cable.

As these examples illustrate, the PSE can make intelligent decisions about whether or not to power a PoE+ PD over Category 3 cable. This dynamic process is significant in that an entire class of Category 3 installations would not be categorically excluded from supporting PoE+ PDs. While only a few examples have been provided above, it should be noted that the PoE+ system can examine a potential Category 3 cable installation using any amount of information that is available to it. In general, the more information that is available, the greater the possibility that the Category 3 cable installation can be validated for PoE+ use.

The principles of the present invention can also benefit conventional PoE+ installations that are based on Category 5 cable. This is especially true when considering the power budgets that are allocated to a PoE+ PSE's ports.

For conventional 802.3af installations, the worst-case power loss attributed to the cable is $P_{loss}=(350 \text{ mA})^2 * 20\Omega = 2.45$ W. This worst-case power loss is based on the current limit per PD of 350 mA due to cable and patch panel limitations and the 20Ω resistance of Category 3 Ethernet cable. In PoE+ installations that double the current, for example, the power loss attributed to the Category 5 cable would be $P_{loss}=(700 \text{ mA})^2 * 10\Omega = 4.9$ W=$2*P_{loss}$. As this simple calculation illustrates, the power loss/meter in PoE+ installations can be double that of conventional 802.3af installations, even factoring in the 50% reduction in the cable resistance. For this reason, the identification of the length of the Category 5 cable can lead to even more significant power budget savings in reducing the worst-case power loss that would be attributable to a port. For example, if the length of the cable is determined to be 25 m, then the power loss at a current of 700 mA would be calculated to be 1.225 W. This is significantly lower than the 4.9 W power loss when 100 m of Category 5 cable is assumed. Of course, the estimated power loss in the cable can be reduced even further if the actual current is estimated using, for example, information regarding $V_{PSE}$, $P_L$, and $R_{cable}$ as described above.

Additionally, the power loss calculation can also benefit from cable type information that is also obtained for PoE+ installations. Here, the determination that the Ethernet cable is better than Category 5 cable (e.g., Category 6 or 7 Ethernet cable) would also serve to reduce the resistance estimate of the cable, thereby further reducing the estimated power loss.

A third application in which the principles of the present invention can be applied is a PoE Broad Reach (PoE-BR) application. In a PoE-BR application, the PD can be connected to the PSE with more than 100 m of Ethernet cable. For example, a PoE-BR application can be defined to support distances up to 500 m or beyond.

Figure 4:
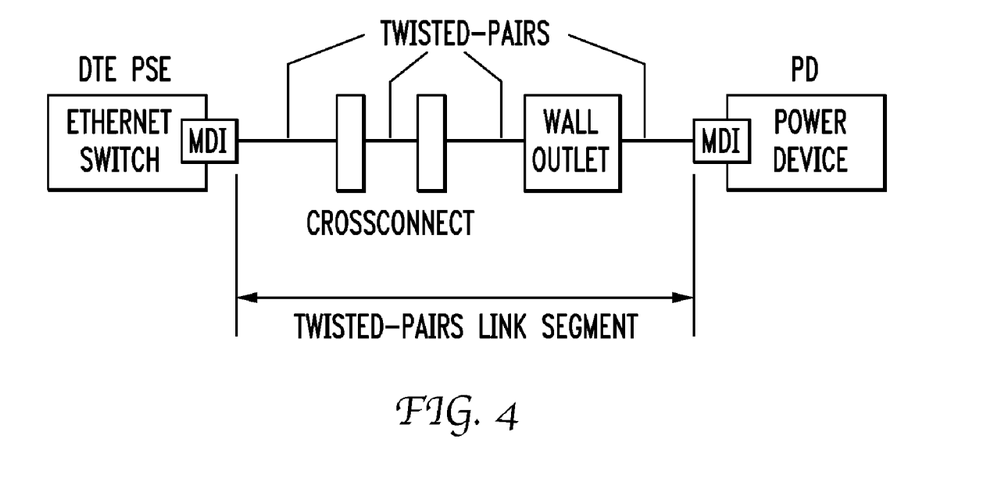
FIG. 4 illustrates an example of connectors in the middle of a medium dependent interface link.

In a PoE-BR application, the determination of a type of Ethernet cable can provide simple benefits in extending the reach of existing PoE applications. Consider, for example, the worst-case 802.3af application that powers a PD over 100 m of Category 3 cable. In this worst-case application, the resistance of the cable is approximately 20Ω. If Category 5 cable is used instead, then the lower resistance of the Category 5 cable can allow a greater length of Category 5 cable while still meeting the equivalent 20Ω resistance. For example, assume a worst-case Category 5 cable that includes connectors in the middle of a medium dependent interface (MDI) link. As illustrated in FIG. 4, the connectors in the middle of the MDI link can be introduced through the inclusion of a cross-connect system, wall outlet, or the like in the middle of the MDI link. In this scenario, the resistance attributed to the Ethernet cable would be approximately 12.5Ω. With this estimate, the length of the Category 5 cable can be extended to 100 m*20/12.5=160 m in matching the 20Ω resistance. Thus, even without any knowledge of the operation of the PoE system, the simple identification of the cable type can lead to a PD being powered at a length greater than 100 m.

In general, the increase in distance between the PSE and PD (e.g., up to 500 m) creates a greater range of potential operation in the PoE-BR system. This range of operation makes it increasingly difficult to provide system specifications using worst-case operating parameters. For example, assume that Category 3 cable is supported by the PoE-BR specification. In addressing this scenario, the resistance of the cable could be specified as 20Ω-100Ω. Clearly, assuming a 100Ω worst-case cable resistance would be impractical in identifying power budgets such as that listed in Table 1. The Category 5 cable specification would also suffer since the resistance of the cable could be specified as 10Ω-50Ω.

It is therefore a feature of the present invention that powering of a PD in a PoE-BR application can be based at least in part on considerations of a particular port installation. For example, assume that it is known that $V_{PSE}$ is 51V, the PD will consume a constant 12.95 W, and that the PD's voltage is 37V. In this case, the current can be calculated as $I=P_L/V_L=12.95$ W/37V=0.34 A. The maximum resistance for the cable is then calculated as $R_{cable}=(V_{PSE}-V_L)/I=(51V-37V)/0.34A=41\Omega$.

With the maximum resistance of $R_{cable}=41\Omega$, the PoE-BR system can then determine whether a particular port can accommodate such an installation. For example, if it is determined that Category 3 cable is used, then the PD can be powered at a distance of up to about 205 meters. Similarly, if it is determined that Category 5 cable is used, then the PD can be powered at a distance of up to about 410 meters.

The cable length information can also be used to determine the power loss attributable to the cable. For example, if it is determined that the Category 5 cable is 400 meters, then the resistance of the cable would be approximately 40Ω assuming 10Ω/meter. The power loss would then be calculated as $P_{loss}=(340 \text{ mA})^2 * 40\Omega = 4.62$ W. The total power budget for that port would then be 12.95 W+4.62 W=17.57 W.

As noted above, the power budget attributable to the port can vary widely due to the range of distances being served by the PoE-BR application. For example, if 120 meters of Category 5 cable was being used, then the resistance of the cable would be approximately 12Ω. The power loss would then be calculated as $P_{loss}=(340 \text{ mA})^2 * 12\Omega = 1.39$ W. The total power budget for that port would then be 12.95 W+1.39 W=14.34 W. The 3.23 W difference (i.e., 17.57 W−14.34 W) between the power budgets in the two scenarios illustrates the benefit of having some insight into the type and/or length of cable instead of relying on basic worst-case assumptions.

Due to the large range of cable resistances in a PoE-BR application, the minimum voltage of the PD may be lowered as compared to conventional 802.3af PoE. For example, assume that the minimum voltage at the PD is lowered to 30V. This 30V value can be used to validate a given port installation when the cable type and length information is known. It should be noted that the PD can have a higher requirement for the turn-on voltage as compared to the minimum voltage. This can be the case because during turn on, the PD is not drawing full power so the voltage at the PD is almost the same as the PSE.

Assume that $V_{PSE}=50V$, $P_L=12.95$ W, and $R_{cable}=45\Omega$ (450 meters of Category 5 cable). For this set of operating parameters, $V_L$ can be calculated as $V_L=(50+/-\text{SQRT}(50^2-4*12.95*45))/2=(48+/-13)/2=30.5V$. After calculating $V_L$, the PoE-BR system can then determine whether the calculated voltage $V_L$ is permissible in light of the minimum voltage. In this case, $V_L=30.5V$ is above the minimum threshold so the PoE-BR system would validate the port under those operating conditions. With respect to the power budget allocated to that port, the PoE-BR system would calculate the current using $V_{PSE}-V_L=I*R_{cable}$, such that 50V−30.5V=I*45Ω results in I=0.433A. The power loss in the cable can be calculated as $I^2*R_{cable}=(0.433A)^2*45\Omega=8.44$ W. The total power budget attributed to the PSE port in this example would then be 12.95 W+8.44 W=21.39 W.

With the principles of the present invention, the overly penal effects of using worst-case resistances in PoE-BR links would be minimized. First, savings in power budgets allocated to particular ports would be achieved, thereby increasing a PSE's overall capacity. Second, the PSE can validate port installations that would be excluded when using worst-case estimates of cable resistances.

As noted above, one or more characteristics of the Ethernet cable are measured to enable the PoE system to estimate the resistance of the Ethernet cable, and ultimately to estimate the actual power loss of the Ethernet cable. To facilitate such an estimate, the PoE system can measure such characteristics as the insertion loss, cross talk, length, etc. of the Ethernet cable. The measurement of the insertion loss, cross talk, and length of the Ethernet cable represents one example of the characteristics that can be used to estimate the cable resistance, and hence the power loss in the cable.

In general, different cable types conform to their own standards defining insertion loss over a range of frequencies. Electrical signals traveling down the cable attenuates differently with respect to the cable type. The insertion loss is a function of both frequency and cable length and is well defined for each cable type. To determine the cable type, the PoE system can transmit one, multiple or continuous pulses with pre-determined frequency components into the cable. At the receiving end, the PoE system can measure the magnitude attenuation and phase distortion, then combine this information with cable length to determine the cable type.

Figure 8:
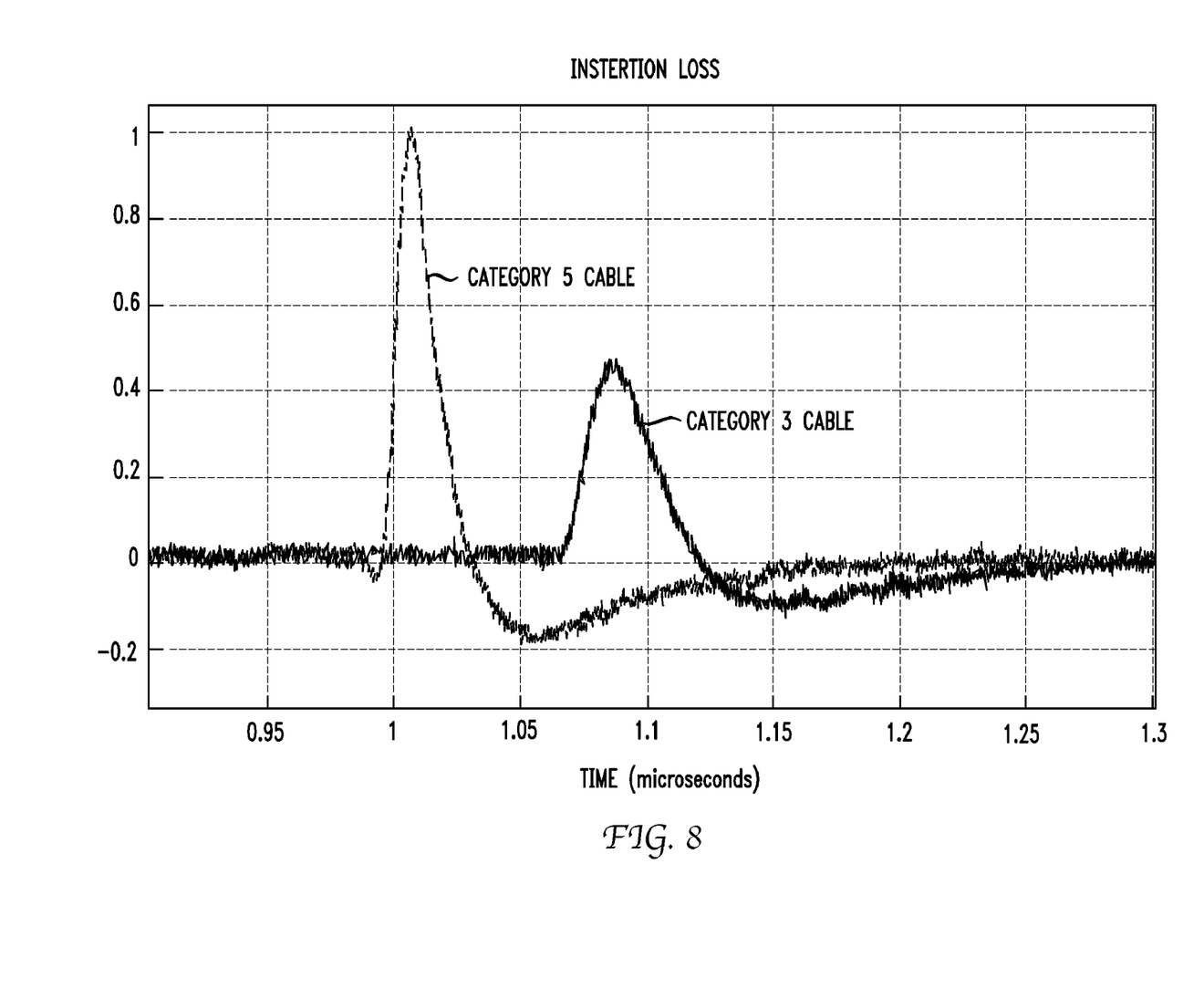
FIG. 8 illustrates an example of insertion loss measurements for Category 3 and Category 5 cable.

In one embodiment, the link partner can be powered off and the cable pair can be disconnected either on the line side of the transformer or on the opposite (transceiver) side of the transformer. In this case, almost all of the incidental pulse(s) are reflected back to the transmitting end with the same polarity, and the pulse(s) undergoes insertion loss corresponding to twice the cable length. FIG. 8 illustrates an example of insertion loss that can be measured for 100 m of Category 3 and Category 5 cable.

Figure 5:
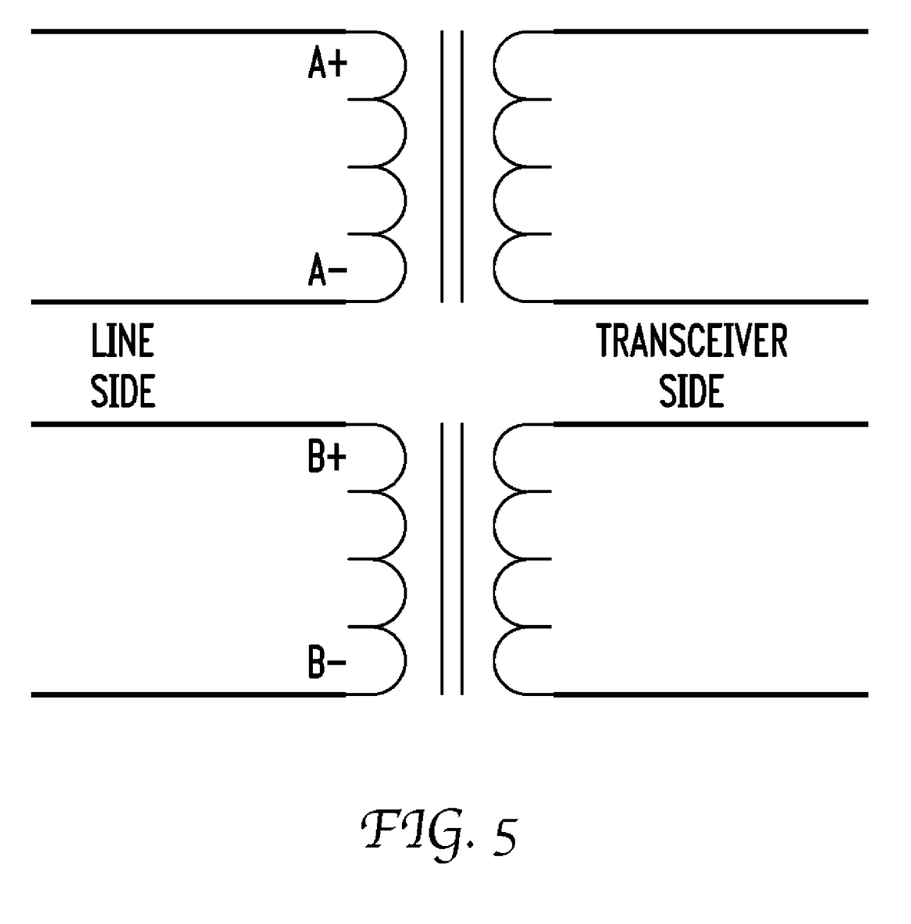
FIG. 5 illustrates a cable pair that can be shorted either on the line side or transceiver side of the transformer.

In another embodiment, the link partner can be powered off and the cable pair is shorted either on the line side of the transformer or on the opposite (transceiver) side of the transformer. This is illustrated in FIG. 5 where A+ is shorted to A−. In this case, almost all of the incidental pulse(s) are reflected back to the transmitting end with the opposite polarity, and the pulse(s) undergoes insertion loss corresponding to twice the cable length.

In another embodiment, the link partner can be powered off and two cable pairs are disconnected and shorted to the other pair to form a loop (e.g., A+ shorted to B+ and A− shorted to B−). This can happen on either the line side of the transformer or on the opposite (transceiver) side of the transformer. In this case, almost all of the incidental pulse(s) are routed back to the transmitting end in a different pair, and the pulse(s) undergoes insertion loss corresponding to twice the cable length.

In another embodiment, the link partner can be temporarily powered on to transmit pre-determined pulse(s). In this case, the pulse(s) undergoes insertion loss corresponding to the cable length.

Cross talk is similar to insertion loss in that different cable types conform to their own standards defining cross talk over a range of frequencies. Electrical signals traveling down the cable injects noise to adjacent pairs differently with respect to the cable type. The cross talk is a function of both frequency and cable length and is well defined for each cable type. To determine the cable type, the PoE system can transmit one, multiple or continuous pulses with pre-determined frequency components into the cable. At the receiving end, the PoE system can measure the magnitude attenuation and phase distortion, then combine this information with cable length to determine the cable type.

Figure 9:
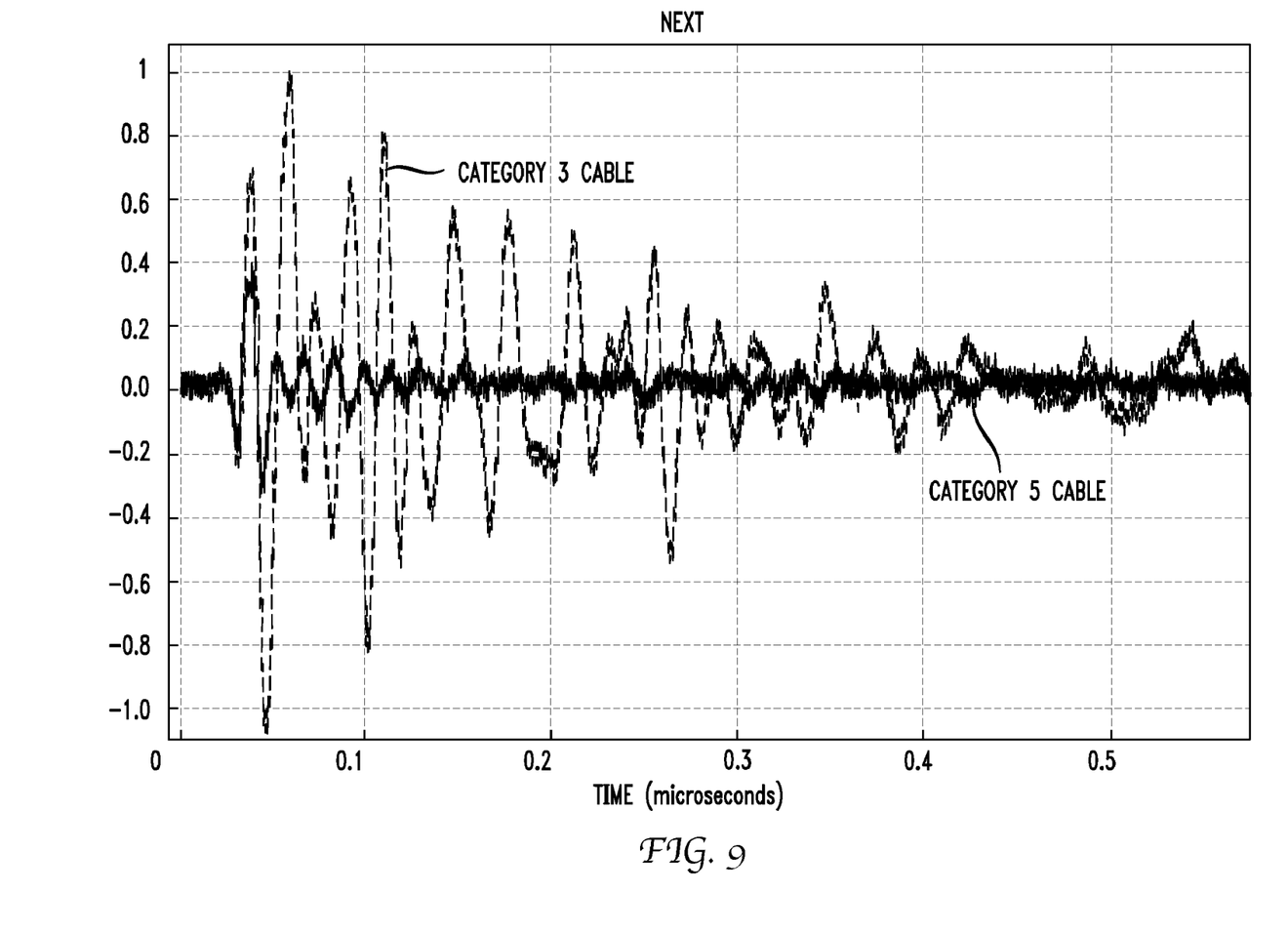
FIG. 9 illustrates an example of near end crosstalk measurements for Category 3 and Category 5 cable.

There are two types of cross talk: Near-end Cross Talk (NEXT) and Far-end Cross Talk (FEXT). For NEXT the noise injection comes from one or multiple local transmitters, while for FEXT the noise injection comes from one or more remote transmitters. Either NEXT or FEXT or a combination can be used to determine cable type. FIG. 9 illustrates an example of NEXT that can be measured for Category 3 and Category 5 cable.

In one embodiment, cable length can be determined directly using time domain reflectometry (TDR). In an alternative embodiment, cable length can be determined indirectly based on data generated in the measurement of insertion loss using a round trip of the injected signal. Here, the time interval between launching and receiving the pulse(s) is linearly proportional to the cable length. The cable length can then be computed by multiplying the propagation speed with the time interval, then divided by two to account for the round-trip delay.

As has been described, various cable characteristics can be used to determine a cable type, and hence the resistance and power loss of the cable. As would be appreciated, other characteristics beyond those described above could also be used to enable the PoE system to determine the resistance and power loss of the cable. Regardless of the measurement data that is used, it is significant that the PoE system can use the data to adjust some aspect of configuration or operation of the PoE system dynamically. As described above, this feature of the present invention is useful in a variety of applications.

Figure 6:
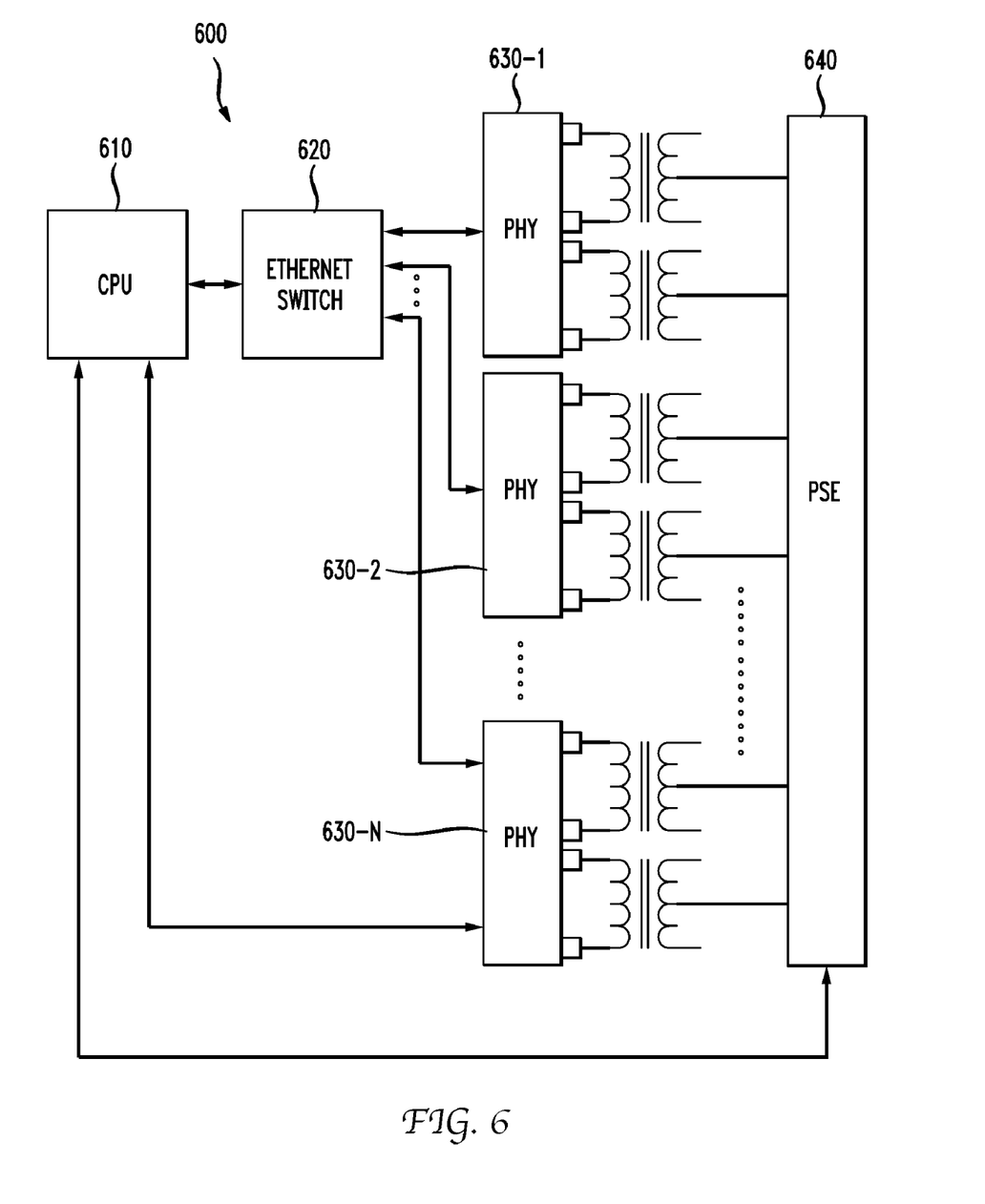
FIG. 6 illustrates an embodiment of a PoE system that enables communication of cable characteristic information from a PHY to a PSE.

FIG. 6 illustrates an embodiment of a PoE environment 600 in which the principles of the present invention can be implemented. As illustrated, environment 600 includes PHYs 630-1 to 630-N that are each connected to Ethernet switch 620. While a PHY can include one or more Ethernet transceivers, the wiring for only a single transceiver is illustrated as being connected to PHY 630-N. Each PHY is also connected to CPU 610, although only a single connection from CPU 610 to PHY 630-N is shown for simplicity. In one embodiment, CPU 610 is incorporated along with Ethernet switch 620 and PHYs 610-1 to 610-N on a single chip. In another embodiment, Ethernet switch 620 and PHYs 610-1 to 610-N are incorporated on a single chip separate from CPU 610, wherein communication with CPU 610 is enabled via a serial interface. Also illustrated in PoE environment 600 is a PSE 640 that provides power through the center taps of the transformers shown. As illustrated, PSE 640 is also coupled to CPU 610 via opto-isolator 650 that facilitates an isolation boundary.

Figure 7:
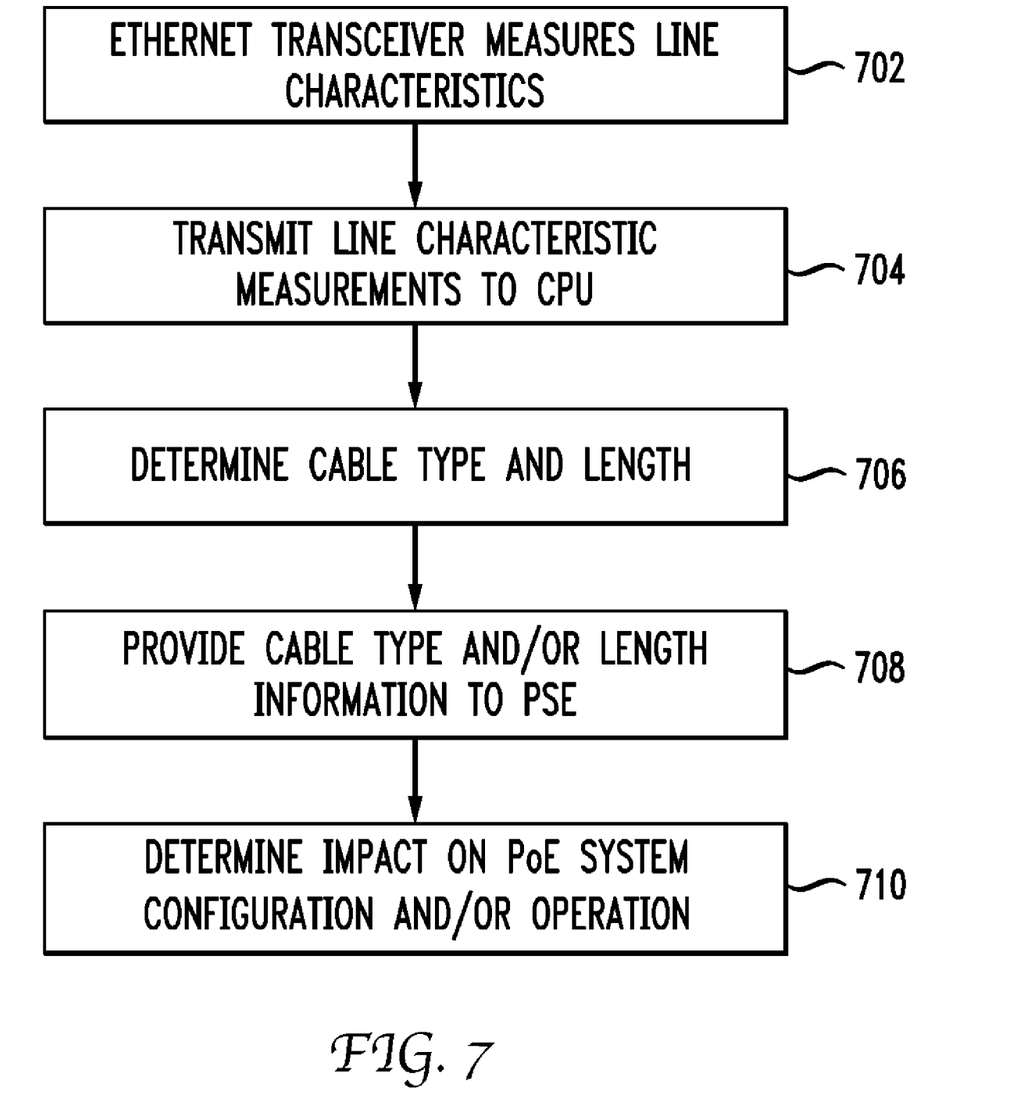
FIG. 7 illustrates a flowchart of a process for communicating cable characteristic information from a PHY to a PSE.

To illustrate the operation of PoE environment 600 in implementing the principles of the present invention, reference is now made to the flowchart of FIG. 7. As illustrated, the flowchart of FIG. 7 begins at step 702 where a transceiver in PHY 630-N measures line characteristics of an Ethernet cable coupled to PHY 630-N. In one embodiment, measurements that enable a determination of insertion loss, cross talk, and cable length are taken during an echo canceller convergence process performed by an echo canceller module under control of CPU 610. Line characteristic measurements taken by the transceiver are then transmitted to CPU 610 at step 704.

Next, at step 706, CPU 610 uses the line characteristic measurement data to determine the cable type and length. This cable type and length information is subsequently provided to PSE 640 at step 708. Here, it should be noted that PSE can also be configured to determine the cable type and length itself using the line characteristic measurement data.

Regardless of where the cable type and length is determined, its availability to PSE 640 would enable PSE 640 to determine its impact on the PoE system configuration and/or operation at step 710. This impact determination can consider the cable type and length, and hence resistance of the cable, in combination with other PoE system parameters such as $V_{PSE}$, $P_L$, $V_L$, etc. As would be appreciated, the impact analysis can be performed by any system element that is responsible for diagnosing the Ethernet cable, determining whether power can be supplied to a PD, determining an adjustment to a power budget for a given PSE port, etc. In general, the impact analysis can be based on one or more parameters such as the cable resistance, cable current, $V_{PSE}$, $P_L$, $V_L$, that can either be communicated, discovered, or assumed by the appropriate system element. For example, one or more parameters can be based on a system specification (e.g., IEEE 802.3af), derived through one or more calculations using measurement data (e.g., cable resistance derived from determined cable type and length), or received from another system element with knowledge of such a parameter (e.g., $V_L$ communicated to the PSE by the PD).

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A power over Ethernet method, comprising:
    identifying a type of Ethernet cable that connects a powered device to a power source equipment;
    determining whether said identified type of cable indicates that said Ethernet cable is qualified for a transmission of power over said Ethernet cable in accordance with a power over Ethernet specification; and
    if it is determined that said identified type of cable is not qualified for said transmission of power in accordance with said power over Ethernet specification, then validating said non-qualified type of cable based on an analysis of characteristics of a port installation that includes said Ethernet cable and said powered device, said validation representing a condition to an initial provisioning of power to said powered device by said power source equipment.

2. The method of claim 1, wherein said power over Ethernet specification is the IEEE 802.3at specification, and said identifying comprises identifying a Category 3 Ethernet cable.

3. The method of claim 1, wherein said characteristics of said port installation include voltages of said powered device and/or said power source equipment.

4. The method of claim 1, wherein said characteristics of said port installation include power of said powered device.

5. The method of claim 1, wherein said characteristics of said port installation include a resistance of said Ethernet cable.

6. The method of claim 1, wherein said identifying comprises identifying a category and a length of said Ethernet cable.

7. A power over Ethernet method, comprising:
    identifying a length of Ethernet cable that connects a powered device to power source equipment;
    determining whether said identified length of Ethernet cable is greater than 100 meters; and
    if it is determined that said identified length of Ethernet cable is greater than 100 meters, then validating said Ethernet cable for a transmission of power in accordance with a power over Ethernet based on an analysis of characteristics of a port installation that includes said Ethernet cable and said powered devices, said validation representing a condition to an initial provisioning of power to said powered device by said power source equipment.

8. The method of claim 7, wherein said power over Ethernet specification is the IEEE 802.3af specification.

9. The method of claim 7, wherein said power over Ethernet specification is the IEEE 802.3at specification.

10. The method of claim 7, wherein said characteristics of said port installation include voltages of said powered device and/or said power source equipment.

11. The method of claim 7, wherein said characteristics of said port installation include power of said powered device.

12. The method of claim 7, wherein said characteristics of said port installation include a resistance of said Ethernet cable.

* * * * *

UNITED STATES PATENT AND TRADEMARK OFFICE
CERTIFICATE OF CORRECTION

PATENT NO. : 7,664,972 B2 Page 1 of 1
APPLICATION NO. : 11/654023
DATED : February 16, 2010
INVENTOR(S) : Diab et al.

It is certified that error appears in the above-identified patent and that said Letters Patent is hereby corrected as shown below:

Col. 12, line 25, before "based" insert --specification--.

Col. 12, line 27, replace "devices" with --device--.

Signed and Sealed this

Thirtieth Day of March, 2010

David J. Kappos
*Director of the United States Patent and Trademark Office*